Jan. 12, 1965 A. H. RICKLING 3,165,666
VERTICAL DEFLECTION CIRCUIT WITH HEIGHT CONTROL FEEDBACK
Filed March 27, 1962
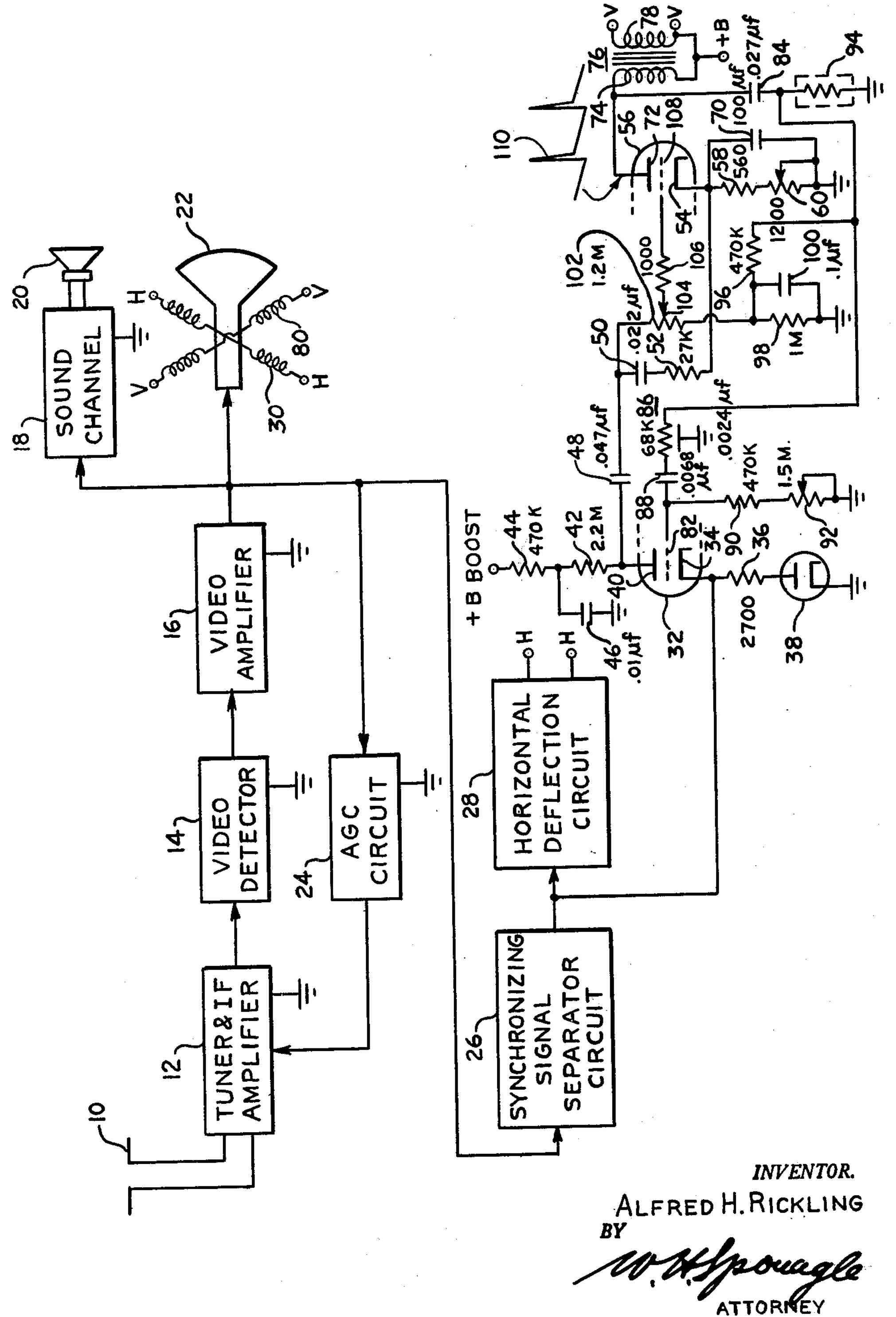
INVENTOR.
ALFRED H. RICKLING
BY
W. H. Sprague
ATTORNEY United States Patent Office 3,165,666

Patented Jan. 12, 1965

3,165,666
VERTICAL DEFLECTION CIRCUIT WITH HEIGHT CONTROL FEEDBACK

Alfred H. Rickling, Indianapolis, Ind., assignor to Radio Corporation of America, a corporation of Delaware Filed Mar. 27, 1962, Ser. No. 182,839
6 Claims. (Cl. 315—27)

This invention relates to television receiver circuits, and more particularly to vertical deflection circuits for generating deflecting signals to apply to the vertical deflecting device of a kinescope, or cathode ray tube image reproducing device, of a television receiver.

In order to reproduce an image on the screen of a cathode ray tube in a television receiver, the electron beam of the tube is caused to scan a raster on the screen of the tube so that light is emitted from the screen in a series of vertically-spaced, horizontal lines. In the scanning process, the electron beam is deflected both vertically and horizontally from its normal position. As is known, present day cathode ray tubes for use in commercial television receivers generally are designed and built to utilize electromagnetic deflection. The electromagnetic deflecting field is provided by a deflection yoke which includes both horizontal and vertical deflection windings through which the proper currents are driven to provide the desired time varying deflecting field.

In order to drive the vertical windings of a deflection yoke, many commercial television receivers use self-oscillating vertical deflection circuits, having two electron tubes, in which the self-oscillations may be synchronized by the vertical deflection synchronizing signals contained in a television video signal. The vertical deflection circuit includes an amplifier electron tube which is capable of supplying sufficient power to drive the vertical windings of the yoke, and a discharge electron tube which is used to control the conduction of the output tube.

In general, a commercial television receiver is designed so that the face of the cathode ray tube is slightly overscanned in both the vertical and horizontal directions to insure that the picture area is completely filled. Line voltage variations resulting in variations of the voltage of the power supply of the receiver, or changes in electron tube characteristics and component values caused by aging, may cause the vertical deflection to change in amplitude. In addition, warm up of the vertical windings changes the amplitude of the deflection. If the vertical deflection becomes too large, the tube face will be overscanned too far in the vertical direction, resulting in an undesired loss of part of the picture. If the vertical deflection becomes too small, the picture will not fill the cathode ray tube face. Manual controls are usually provided on television sets to adjust the vertical scanning height, but the trend in receiver design is to make these adjustments accessible only to a serviceman. Even if the control were available to a user, it would be undesirable to require him to readjust the vertical height with the relatively frequent power line voltage variations.

Briefly, in accordance with the invention, a vertical deflection circuit comprises a vertical amplifier or output tube and a vertical discharge tube, with feedback between the output tube and the discharge tube to provide self-oscillations in the circuit. An amplitude detecting circuit, including a voltage dependent resistor, is connected to the anode of the output tube to measure the amplitude of the vertical retrace pulse appearing on the anode. The amplitude of this pulse is a measure of the height of the vertical deflection. A control voltage is derived from the amplitude detecting circuit and applied to the control grid of the output tube to maintain the output signal from the output tube relatively constant despite component changes or power supply variations.

The invention may be more completely understood when the following detailed description is read in connection with the accompanying drawing, in which the sole figure is a schematic circuit diagram, partly in block form, of a television receiver having a vertical deflection circuit in accordance with the invention.

The drawing shows a television receiver, which includes an antenna 10 for intercepting and supplying a radio frequency television wave to the tuner and IF amplifier 12 of the receiver. The radio frequency television wave has a picture carrier amplitude modulated with video signals, containing image signals and horizontal and vertical deflection synchronizing signals, and a sound carrier (spaced 4.5 mc. in frequency from the picture carrier according to present day standards) frequency modulated with sound signals. An amplified intermediate frequency version of the radio frequency wave is available at the output of the tuner and IF amplifier 12 and is applied to a video detector 14, where the amplitude modulation of the IF wave is detected to provide the video signal containing image signals and horizontal and vertical deflection synchronizing signals. Also, the picture and sound IF carriers are heterodyned in the video detector 14 to provide a 4.5 mc. intercarrier sound signal which is frequency modulated with the sound signals. The detected video signals and the intercarrier sound signals are applied to a video amplifier 16. The intercarrier sound signals are applied from the video amplifier 16 to a sound channel 18 where they are demodulated and applied to a loudspeaker 20 to reproduce the sound information.

As is known, the video signals are also applied from the video amplifier 16 to a kinescope 22 or cathode ray tube, to modulate the intensity of the electron beam of the tube with the image signals of the video signal. The video signals are further applied to an AGC (automatic gain control) circuit 24, which generates a control voltage from the video signals to control the gain of prior amplifiers in the receiver, such as the radio frequency and intermediate frequency amplifiers, to maintain the amplitude changes of the detected video signals within a small range despite any large changes in the amplitude of the received radio frequency wave.

The video signals are also applied to a synchronizing signal separator circuit 26, to separate the horizontal and vertical deflection synchronizing signals from the video signals. The video detector 14 is designed to deliver negative going video signals, that is, the peaks of the video signals (horizontal and vertical synchronizing portions) are more negative than the image portions of the video signals. The polarity of the detected video signals is reversed through the video amplifier 16 and positive going video signals are thus applied to the synchronizing signal separator circuit 26. The polarity of the separated synchronizing pulses is negative at the output of the synchronizing signal separator circuit 26.

Separated horizontal synchronizing pulses from the synchronizing signal separator circuit 26 are applied to a horizontal deflection circuit 28 (which may be of any known design) for the receiver, and its output, available at its output terminals H—H, is connected to the terminals H—H of a set of horizontal deflection windings 30 positioned on the kinescope 22 in the usual manner to deflect the electron beam in the horizontal direction.

The vertical deflection circuit of the receiver embodying the invention comprises a triode electron tube as a discharge tube 32 having its cathode 34 connected to ground, or reference potential for the receiver, through the series combination of a cathode resistor 36 and a diode 38. The diode 38 has its anode connected to the cathode 34 of the discharge tube 32 through the cathode resistor 36, and its cathode connected directly to ground for the receiver so that it is poled to conduct current in the same direction as the discharge tube 32. The anode 40 of the discharge tube 32 is connected to a relatively high value of direct operating voltage, such as the known +B-Boost circuit used in many present day television receivers, through a pair of serially connected charging resistors 42, 44, the junction of which is bypassed to ground, at horizontal deflection frequency, by a first bypass capacitor 46. The anode 40 is also connected through a first coupling capacitor 48, a charging capacitor 50, and a peaking resistor 52 to the cathode 54 of an amplifier output tube 56. Bias is provided for the output tube 56 by connecting its cathode 54 to ground through a cathode resistor 58 and a vertical linearity potentiometer 60, connected in series, and bypassed by a second capacitor 70 of large capacitance value. The anode 72 of the output tube 56 is connected to a source of low voltage operating potential for the receiver, +B, through the primary winding 74 of a vertical output transformer 76, whose secondary winding 78 is connected directly to a set of vertical deflection windings 80 positioned on the kinescope 22 in the usual manner, as indicated by the terminals V—V on the vertical deflection windings 80 and the transformer secondary winding 78. One end of the secondary winding 78 is further connected to the source of low voltage operating potential, +B.

The vertical deflecting circuit is made self-oscillating by a feedback circuit connected between the anode 72 of the output tube 56 and the control grid 82 of the discharge tube 32. The anode 72 of the output tube 56 is connected to the control grid 82 of the discharge tube 32 through a second coupling capacitor 84, an integrating network 86 (which is a combined resistor and capacitor), and a storage capacitor 88. The function of the integrating network 86 is, as is known, to eliminate the feedback of any extraneous horizontal pulses to the discharge tube 32 which may prevent the vertical circuit from effecting line interlacing in the proper manner. The control grid 82 is further connected to ground through the series combination of a grid resistor 90 and a potentiometer 92. The potentiometer 92 serves as the vertical hold or vertical frequency control.

The second coupling capacitor 84 is also connected to one end of a voltage dependent resistor (VDR) 94. The other end of the VDR 94 is connected to ground for the receiver. A pair of resistors 96, 98, are connected in series across the VDR 94, and their junction is connected to ground through a filter capacitor 100. A height control potentiometer 102 for the circuit has its end terminals connected between the junction of the pair of resistors 96, 98, and the junction of the first coupling capacitor 48 and the charging capacitor 50. A variable tap 104 on the height control potentiometer 102 is connected through an oscillation suppression resistor 106 to the control grid 108 of the output tube 56.

The circuit operates in the following manner: assume that the source of voltage +B-Boost is turned on. The charging capacitor 50 begins to charge through the charging resistors 44, 42, the first coupling capacitor 48, the peaking resistor 52, and the cathode biasing network of the amplifier tube 56, which includes series connected resistors 58 and 60 and the second bypass capacitor 70. The voltage across the charging capacitor 50 thus begins to rise in a positive direction. The rising positive voltage appears across the height control potentiomenter and all, or a portion of it, is applied through the tap 104 to the control grid 108 of the output tube 56. The current through the output tube 56, and thus through the primary winding 74 of the transformer 76, begins to rise. When the voltage on the control grid 108 rises to a point more positive than the cathode 54 the current will cease to change through the output tube 56 and through the primary winding 74 and a positive retrace voltage pulse is generated. The wave form 110 represents the form of the voltage at the anode 72. The retrace voltage pulse is applied through the coupling capacitor 84, the filter network 86, and the storage capacitor 88 to the control grid 82 tube of the discharge tube 32. The discharge tube 32 begins to conduct heavily through the diode 42 to discharge the charging capacitor 50. The pulse of voltage on the control grid 82, however, drives this grid highly positive with respect to the cathode 34, and a large negative voltage is built up on the grid side of the storage capacitor 88 which cuts off current flow through the discharge tube 32. The charging capacitor 50 then begins to charge again in the manner previously described. Additionally, the storage capacitor 88 begins to discharge through the grid resistor 90, the vertical hold potentiometer 92, the resistor in the filter network 86, the pair of resistors 96, 98, and VDR 94. When the negative voltage on the storage capacitor 88 is dissipated, the discharge tube 32 begins to conduct to again discharge the charging capacitor 50. This action abruptly reduces the current through the output tube 56 and again generates a positive retrace voltage pulse at the anode 72, which is applied through the feedback circuit in the manner previously described and the cycle repeats itself.

The circuit is synchronized by a negative vertical synchronizing pulse on the cathode 34 of the discharge tube 32 which causes current flow in the discharge tube 32 to begin the discharge of the charging capacitor 50. A large negative pulse is thus developed at the anode 40 of this tube and applied through the first coupling capacitor 48 to the control grid 108 of the output tube 56, which, in turn, generates a large positive retrace voltage pulse at its anode 72. The positive retrace voltage pulse is applied through the feedback network to the control grid 82 of the discharge tube 32 which initially drives the discharge tube 32 to conduct current more heavily and eventually places a large negative charge on the grid side of the storage capacitor 88, as previously explained, to cut off current flow in the discharge tube 32. The charging capacitor 50 thus begins to charge again and the storage capacitor 88 begins to discharge. The cycle is repeated when the next vertical synchronizing pulse appears at the cathode 34 of the discharge tube 32. Except when the discharge tube 32 is conducting, the diode 38 provides a high impedance across which to develop the vertical synchronizing pulse signal; yet, when the discharge tube 32 is conducting, the diode 38 provides a low impedance discharge path for the charging capacitor 50.

The flow of current during trace time through the vertical deflection windings 80 generates a sawtooth voltage which appears on the anode 72 of the output tube 56. During retrace time, however, the abrupt cutoff of the deflection current results in a large positive retrace voltage pulse being developed on the anode 72. This wave is shown as waveform 110 on the drawing. Waveform 110 is an unsymmetrical wave, in that it has a relatively low amplitude portion during trace time, which is of relatively long duration; and a relatively high amplitude portion during retrace time which is of relatively short duration. The amplitude of the pulse portion of the wave 110 is proportional to the amount of current that flows through the vertical deflection windings 80, and, thus, the amplitude of the pulse portion is a measure of the amplitude of the deflection current flowing through vertical deflection windings 80 and in turn a measure of the height of the raster area on the face of the picture tube 22.

The voltage on the anode 72 of the output tube 56 is coupled through the capacitor 84 directly across the VDR 94. The characteristics of the VDR 94 are such that its resistance is relatively high when it is subjected to a low voltage and relatively low when it is subjected to a high voltage. In the particular VDR 94 used in the circuit shown in the drawing, the current changed through it as the 3.5 power of the voltage across it. The voltage on the anode 72 is capacitively coupled to the VDR 94 and the pulse portion of the wave 110 will cause more current to flow in one direction through the VDR 194 than the relatively small portion of the sawtooth voltage will cause to flow in the opposite direction. This difference in current flowing in the two directions flows through the pair of resistors 96, 98. The filter capacitor 100 shunted across the resistor 98 thus stores a negative voltage which is proportional to the amplitude of the pulse portion of the waveform 110.

The low voltage end of the height control potentiometer 102 is connected to the junction of the pair of resistors 96, 98 and thus the control grid 108 of the output tube is biased through the height control potentiometer 102, the top 104 and the resistor 106 by the voltage appearing at the junction of the pair of resistors 96, 98. If the amplitude of the pulse portion of the wave 110 tends to increase (indicating an increase in the deflection current and consequent increase in vertical picture height), a greater than normal negative voltage is developed at the junction of the resistors 96, 98 making the grid 108 of the output tube 56 more negative, reducing the gain of the tube and tending to bring the deflection current back to it desired value. The opposite action will occur if the amplitude of the pulse portion of the wave 110 decreases, that is, the junction of the pair of resistors 96, 98 becomes less negative, increasing the gain of the output tube 56 tending to increase the deflection current.

The control voltage arrangement of this invention thus tends to maintain the output deflection current of a vertical deflection circuit substantially constant even though the supply voltages to the circuit or the circuit constants should change because of the ageing or heating.

What is claimed is:

1. In a television receiver having a cathode ray image reproducing tube and an electromagnetic deflection yoke for said tube including vertical deflection windings, a vertical deflection circuit comprising in combination:
   circuit means for developing a substantially sawtooth voltage waveform;
   an amplifying device having an input electrode and an output electrode;
   means for applying said sawtooth voltage to the input electrode of said device;
   means for connecting the output electrode of said device to said vertical deflection windings for applying deflection current to said windings and for developing retrace voltage pulses;
   means responsive to said retrace voltage pulses for developing a direct control voltage having an amplitude proportional to the average amplitude of said retrace voltage pulses;
   and means for applying said direct control voltage to the input electrode of said device to maintain the amplitude of said deflection current substantially constant.

2. In a television receiver having a cathode ray image reproducing tube and an electromagnetic deflection yoke for said tube including deflection windings, a vertical deflection circuit comprising in combination:
   circuit means for developing a substantially sawtooth voltage waveform;
   an electron tube having an input electrode and an output electrode;
   means for applying said sawtooth voltage to the input electrode of said tube;
   means for connecting the output electrode of said tube to said vertical deflection windings for applying deflection current to said winding and for developing retrace voltage pulses;
   means including a voltage dependent resistor responsive to said retrace voltage pulses for developing a direct control voltage having an amplitude proportional to the average amplitude of said retrace voltage pulses;
   and means for applying said direct control voltage to the input electrode of said tube to maintain the amplitude of said deflection current substantially constant.

3. In a television receiver having a cathode ray image reproducing tube and an electromagnetic deflection yoke for said tube including vertical deflection windings, a vertical deflection circuit comprising in combination:
   a charging capacitor;
   charging circuit means for said charging capacitor including a source of direct voltage;
   discharge circuit means for said charging capacitor including a first electron tube connected across said charging capacitor;
   a second electron tube having an input electrode and an output electrode;
   means for applying the voltage across said charging capacitor to the input electrode of said second tube;
   means for connecting the output electrode of said second tube to the vertical deflection windings for applying deflection current to said windings and developing retrace voltage pulses at the output electrode of said second tube;
   means connected between the output electrode of said second tube and said first tube to cause self-oscillations in said circuit to sequentially charge said charging capacitor through said charging circuit means and to discharge said charging capacitor through said discharge circuit means;
   further means, including a voltage dependent resistor, connected to the output electrode of said second tube for deriving a direct control voltage responsive to the amplitude of said retrace voltage pulses; and
   means for applying said direct control voltage to the input electrode of said second electron tube to maintain the amplitude of said deflection current substantially constant.

4. In a television receiver having a cathode ray image reproducing tube and an electromagnetic deflection yoke for said tube including vertical deflection windings, and further having a source of vertical synchronizing signals, a vertical deflection circuit comprising in combination:
   a charging capacitor;
   charging circuit means for said charging capacitor including a source of direct voltage and a peaking resistor connected in series with said charging capacitor;
   discharge circuit means for said charging capacitor including a first electron tube having a cathode, anode, and control grid and having the anode to cathode path of said tube connected across the series combination of said charging capacitor and said peaking resistor;
   a second electron tube having an input electrode and an output electrode;
   means for applying the voltage across the series combination of said charging capacitor and said peaking resistor to the input electrode of said second tube;
   transformer means for connecting the output electrode of said second tube to the vertical deflection windings for applying deflection current to said windings and developing retrace voltage pulses on the output electrode of said second tube;
   feedback means connected between the output electrode of said second tube and the control grid of said first tube to cause self-oscillation in said circuit to sequentially charge said charging capacitor through said charging circuit means and to discharge said charging capacitor through said discharge circuit means;
   means for applying signals from said source of vertical synchronizing signals to said deflection circuit to initiate the discharge of said charging capacitor and synchronize said self-oscillations with said vertical synchronizing signals;
   means, including a voltage dependent resistor connected to the output electrode of said second tube to develop said retrace voltage pulses thereacross, for developing a direct control voltage responsive to the amplitude of said retrace voltage pulses; and means for applying said direct control voltage to the input electrode of said second tube to maintain said deflection current substantially constant.

5. In a television receiver having a cathode ray image reproducing tube and an electromagnetic deflection yoke for said tube including vertical deflection windings, a vertical deflection circuit comprising in combination:

circuit means for developing a substantially sawtooth voltage waveform;

an amplifying device having an input electrode and an output electrode;

means for applying said sawtooth voltage to the input electrode of said amplifying device;

means for connecting the output electrode of said amplifying device to said vertical deflection windings for applying deflection current to said winding and for developing retrace voltage pulses;

first feedback means arranged between said deflection windings and said circuit means to cause self-oscillations of said circuit means;

means responsive to said retrace voltage pulses for developing a direct control voltage; and second feedback means for applying said direct control voltage to the input electrode of said amplifying device to maintain the amplitude of said deflection current substantially constant.

6. In a television receiver having a cathode ray image reproducing tube and an electromagnetic deflection yoke for said tube including vertical deflection windings, a vertical deflection circuit comprising in combination:

circuit means for developing a substantially sawtooth voltage waveform;

an amplifying device having an input electrode and an output electrode;

means for applying said sawtooth voltage to the input electrode of said device;

a resistive voltage divider connected in circuit with said input electrode of said device;

a capacitor arranged across a portion of said resistive voltage divider;

means for connecting the output electrode of said device to said vertical deflection windings for applying deflection current to said windings and for developing retrace voltage pulses;

feedback means including a voltage dependent resistor connected in circuit between said vertical deflection windings and said capacitor, said feedback means being responsive to said retrace voltage pulses for developing a direct control voltage across said capacitor having an amplitude proportional to the average amplitude of said retrace voltage pulses, whereby at least a portion of said direct control voltage is applied to the input electrode of said device to maintain the amplitude of said deflection current substantially constant.

References Cited in the file of this patent

UNITED STATES PATENTS

| | | |
|---|---|---|
| 2,385,260 | Cox | Sept. 18, 1945 |
| 2,602,147 | Cope et al. | July 1, 1952 |
| 2,879,448 | Putzrath | Mar. 24, 1959 |

FOREIGN PATENTS

| | | |
|---|---|---|
| 446,698 | Italy | Mar. 23, 1949 |